United States Patent [19]

Carr

[11] Patent Number: 4,472,342

[45] Date of Patent: Sep. 18, 1984

[54] MANUFACTURE OF A BODY CAVITY INSERT

[76] Inventor: Peter J. Carr, 59, Forrest Rd., Edinburgh, Scotland

[21] Appl. No.: 335,989

[22] Filed: Dec. 30, 1981

Related U.S. Application Data

[63] Continuation of Ser. No. 083,322, Oct. 10, 1979, abandoned.

[30] Foreign Application Priority Data

May 31, 1978 [GB] United Kingdom ............... 26028/78
Sep. 28, 1979 [GB] United Kingdom ............... 79302021

[51] Int. Cl.[3] ......................... B29C 1/02; B29C 17/04

[52] U.S. Cl. ..................................... 264/554; 181/135; 264/510; 264/222

[58] Field of Search ............... 264/510, 516, 554, 222; 181/135

[56] References Cited

U.S. PATENT DOCUMENTS

| | | | |
|---|---|---|---|
| 2,474,676 | 6/1949 | Kelly | 264/516 X |
| 2,596,351 | 5/1952 | Weaver | 181/135 |
| 2,738,850 | 3/1956 | Tooker | 181/135 |
| 3,021,569 | 2/1962 | Lyman | 264/554 X |
| 3,532,776 | 10/1970 | Kopp | 264/510 X |
| 3,688,863 | 9/1972 | Johnson | 181/135 |
| 3,703,572 | 11/1972 | Bellasalma | 264/510 |
| 4,010,820 | 3/1977 | Johnson | 181/135 |

FOREIGN PATENT DOCUMENTS

| | | | |
|---|---|---|---|
| 127274 | 4/1948 | Australia | 264/222 |

*Primary Examiner*—Jan H. Silbaugh
*Attorney, Agent, or Firm*—Eugene E. Renz, Jr.

[57] ABSTRACT

A method of making a body cavity insert, e.g. an ear insert, comprises deforming by pressure a pressure deformable sheet of material over an impression of a body cavity, e.g. an ear canal, and separating the impression from the sheet of material without permanently disturbing the shape into which the sheet has been deformed to leave a mould cavity in the sheet of material. A moulding material is then introduced into the mould cavity to provide, when the moulding material solidifies, the body cavity insert.

Typically the pressure deformable sheet of material is a sheet of non-toxic, thermoplastics material, e.g. a polycarbonate or silicon rubber material. One example of a suitable moulding material is an acrylic plastics material.

1 Claim, 2 Drawing Figures

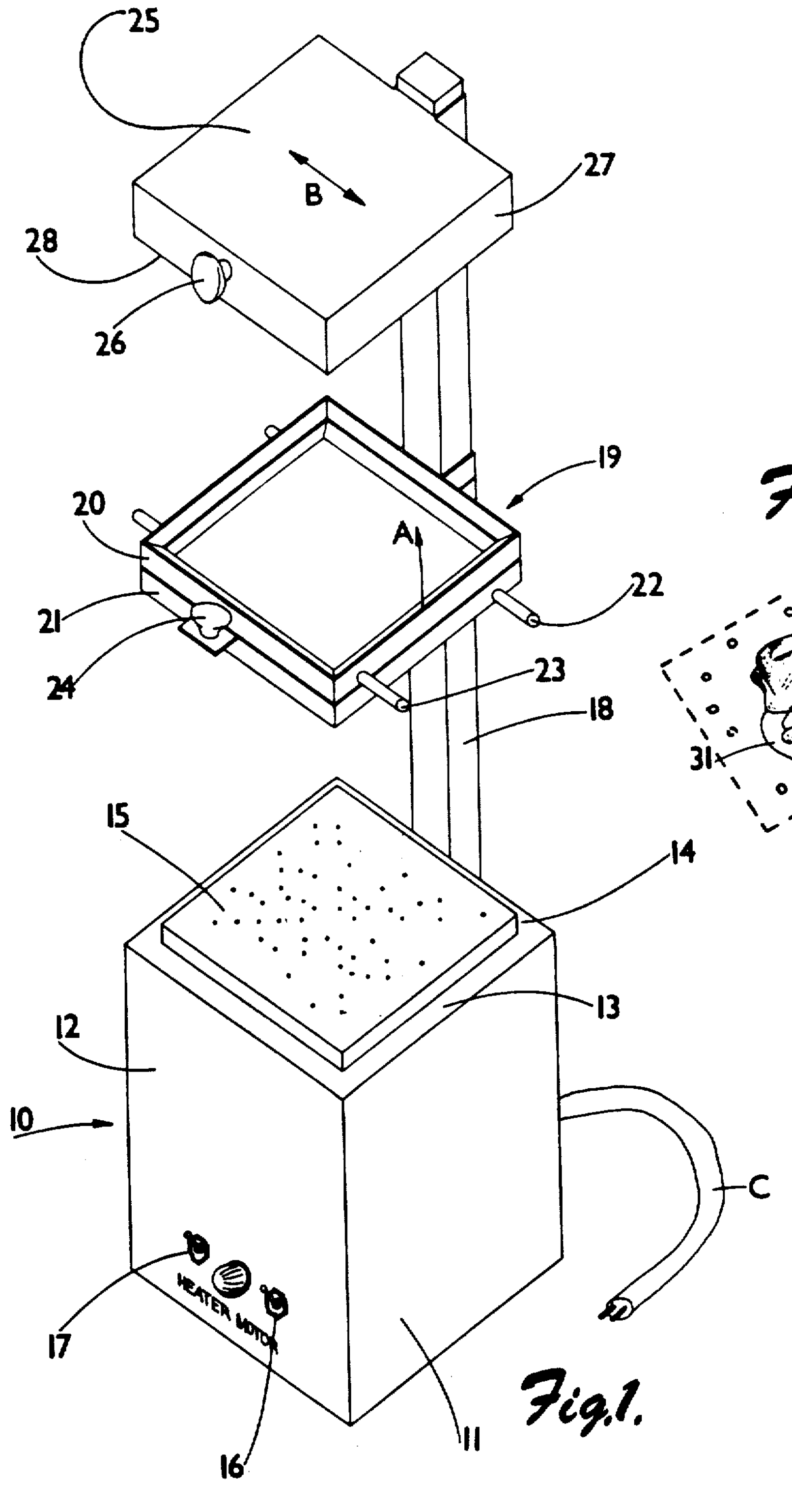
Fig.1.
Fig.2.
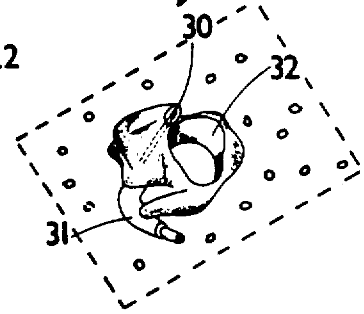

MANUFACTURE OF A BODY CAVITY INSERT

This application is a continuation of application Ser. No. 083,322 filed Oct. 10, 1979, now abandoned.

BACKGROUND OF THE INVENTION

1. Field of the Invention

This invention relates to a method of making a body cavity insert, which method comprises forming an impression of a body cavity (e.g. an ear canal), using the impression to form a mould cavity in a mould, and introducing moulding material into the mould cavity to form the body cavity insert. Although the invention may be applied to making gum and mouth shields for sportsmen or for other dental applications, e.g. as an insert to straighten teeth, the invention is primarily concerned with making an ear insert.

2. Description of the Prior Art

Ear inserts for use in deaf aids or for other specialised applications, e.g. for aids in speech training, are currently usually made by a method which is time-consuming and of whose products only about 80% are normally satisfactorily useful for their intended purpose.

This known method involves forming an impression of an ear canal and dipping the impression into molten wax to form a wax coating on the surface of the impression. The purpose of the wax coating is to compensate for removal of material from a moulded insert by polishing which, as mentioned later, it is necessary to carry out after the moulding operation. The wax-coated impression is inserted into a body of soft plaster of Paris contained in the lower half of a two-part flask, the lower half of the flask and plaster when set forming the lower half of a two-part plaster mould. After the plaster has set its upper surface is coated with a separator solution containing a material for facilitating separation of the two mould parts when they are subsequently placed together in contact. When the separator solution has dried, the upper half of the flask is filled with soft plaster of Paris and the two flask parts brought and held together. After the plaster in the upper flask part has set hard, the two flask parts are separated and the impression is removed. An acrylic moulding material is then introduced into the resulting mould cavity after wax has been removed and the cavity treated with separator solution and allowed to dry. The two parts of the flask are then brought and secured together and the flask is pressurised for ten to fifteen minutes and the acrylic material cured for from two to three hours whilst the flask is retained in a clamp. The moulded insert is then removed, trimmed and polished, considerable polishing being required due to the rough surface of the insert occasioned by the comparatively rough finish of the plaster mould cavity.

Although removal of material by the polishing is compensated for by the wax coating on the impression initially used, the wax coating is in practice never evenly distributed over the surface of the impression. This variation in the thickness of the wax coating, together with inevitable variations in the degree of polishing as dictated by surface roughness variations between one moulded insert and another, mean that in a certain proportion of products the insert does not form a snug fit when placed in a human ear canal. If the insert does not form a snug fit in the ear canal, acoustic feedback may occur in use, making the insert unsatisfactory.

BRIEF SUMMARY OF THE INVENTION

The present invention seeks to provide a relatively simple and economic method of making a body cavity insert which accurately reproduces the shape of the body cavity into which the body cavity insert is to be inserted and which requires little or no polishing to remove rough surfaces formed during moulding of the body cavity insert.

It is also an aim of the present invention to reduce the proportion of body cavity inserts which do not form snug fits within the body cavities with which they are intended to be used. In particular, when making ear inserts, it is an aim of the present invention to reduce the proportion of ear inserts which in use result in acoustic feedback in the user's ear canal.

According to the present invention there is provided a method of making a body cavity insert comprising forming an impression of a body cavity, using the impression to form a mould cavity in a mould, and introducing moulding material into the mould cavity, wherein the improvement comprises forming the mould cavity by deforming, by means of a pressure, a pressure deformable sheet of material over the impression of the body cavity, e.g. ear canal, so as to conform the sheet to the shape of the impression, and separating the impression from the sheet of material without permanently disturbing the shape into which said sheet has been deformed to leave the mould cavity in the sheet material.

The mould cavity produced in the sheet material is an almost exact replica of the impression and has a comparatively smooth surface finish. This means that the resulting moulded body cavity insert has a surface finish requiring little or no polishing and can be fitted snugly into the patient's body cavity (e.g. ear canal). Furthermore the mould cavity is produced more economically and reproduces a patient's body cavity, such as an ear canal, more accurately than known methods.

Typically the pressure-deformable sheet of material is a sheet of plastics material, preferably a sheet of thermoplastics material.

The pressure deformable sheet may be made of a toxic material or a non-toxic material. However it is preferred that the sheet is made of a non-toxic material which does not arouse an allergic response in humans. Non-toxic materials are preferred since with patients allergic to certain moulding materials, e.g. acrylic materials, the deformed sheet material can be used as a protective skin over an insert made of less costly, but allergenic material, e.g. acrylic material. Examples of non-toxic, non-allergenic materials of which the sheet may be made are polycarbonates, polystyrene, perspex and a silicone rubber.

The impression may be a solid impression and the material of which the impression is made may be any one of a variety of materials known in the art for this purpose. For example, the material used to make the impression may be alginate, rubberized silicone, plaster (e.g. plaster of Paris), plasticine, wax, stone or "Paribar".

Alternatively, the impression may be formed by pressure deforming a sheet of pressure deformable material, e.g. plastics material, into the body cavity.

The moulding material introduced into the cavity vacated by the impression will normally be a plastics material, conveniently an acrylic material (e.g. methyl methacrylate), a polycarbonate, a silicone rubber or materials which set hard when mixed together. However, any other self-curing moulding material may be used. The solidified moulding material is preferably a soft or semi-soft material, although the insert may be made out of a hard material, or a combination of hard, soft or semi-hard material.

The moulding material may be clear or coloured, e.g. pink, and may also include a further colorant, for example a pulverized blood red, blue or pink coloured rayon flock.

Included within the scope of the invention is a method of making a mould for use in making a body cavity insert, e.g. an ear insert, such mould being useful alternatively as a protective skin as referred to earlier or as an impression as just mentioned. The method comprises the pressure-deforming step referred to earlier followed by separation of the impression from the sheet of material without permanently disturbing the shape into which the sheet of plastics material has been formed by said deformation.

In the methods according to the invention of making body cavity insert and of making a mould for use in making a body cavity insert, formation of the mould cavity may be accomplished by placing the body cavity impression on a plate having openings, e.g. perforations or slits, therethrough, disposing a sheet of thermoplastics material above the impression, applying heat to the sheet of thermoplastics material to thermo-soften it lowering the sheet of thermoplastics material onto the impression and applying a suction to the lowered sheet of plastics material through the openings in the plate so as to effect suction-drawing of the sheet of thermoplastics material over the impression so as to conform the sheet to the shape of the impression.

The sheet of thermoplastics material may be heated in any convenient way, e.g. by means of a heating element disposed above the sheet of plastics material, or even by means of a naked flame.

The sheet of plastics material may be manually lowered over the impression. However preferably the sheet is retained in a frame, for example by use of a screw clamp, mounted so as to enable the necessary lowering of the sheet of plastics material onto the impression.

Apparatus of any of the kinds just referred to are to be understood to be included within the scope of the invention.

BRIEF DESCRIPTION OF THE DRAWING

The invention will now be described, by way of example, with reference to the accompanying drawing, in which:

FIG. 1 is a perspective view of apparatus for performing the method according to the invention, and FIG. 2 is a perspective view of an ear insert made according to the invention.

DETAILED DESCRIPTION OF THE INVENTION

The apparatus shown in FIG. 1 comprises an electric motor driven fan assembly 10 having a motor housing 11, a fan housing 12 and an end plate 13 which is formed with upwardly extending walls 14 defining a rectangular aperture which serves as an air inlet and across which is disposed a perforated plate 15. A cable C for connection of the motor of the fan assembly 10 to a source of electric current (not shown) enters the motor housing 11 through an aperture provided for the purpose. Two toggle switches 16 and 17 are mounted in apertures provided on the front of the motor housing 11, switch 16 being provided for switching on and off of the electric motor and switch 17 being provided for switching on and off of a heater the purpose of which is mentioned below.

A track 18 is secured to the rear of the motor housing 11 and extends vertically to a point some distance above the perforated plate 15.

A frame 19 is mounted by means (not shown) for vertical movement on the track 18 and means (also not shown) are provided to enable the frame 19 to be secured in fixed position of the track 18.

The frame 19 comprises an upper frame member 20 and a lower frame member 21, the two being hinged together by conventional hinges (not shown) provided between opposing faces of each frame member 20, 21, at the left-hand side (as viewed in FIG. 1) of the frame 19 so that the two frame members can be parted by movement in the direction shown by the arrow A. Two handles 22 and 23 are provided on the right-hand side (as viewed in FIG. 1) of the frame 19 to assist in parting the two frame members 20 and 21. A conventional screw clamp 24 is provided on the front of the frame 19 to secure the two frame members together in use.

A heater assembly 25 is secured to an upper part of the track 18 above the frame 19. The heater assembly 25 is mounted so as to be vertically fixed but so as to be movable from side-to-side (in the directions of the arrows B) to enable easy access to the frame 19. A knob 26 is provided on the front of the heater assembly 25 to assist in such side-to-side movement.

The heater assembly 25 comprises a parallelepipedic housing 27 closed on its four sides and its top but open at its base 28. Housed in the housing 27 is an electrical resistance heating element (not shown) connected to a source of electrical current (not shown) through the switch 17 by means of electrical wiring concealed by the track 18 in the view shown.

Use of the apparatus just described for making a mould for use in making an ear insert will now be described.

The frame 19 is moved to its lowest position on the frame 18, in which position the track 19 is supported by the top of the fan assembly 10, and the heater assembly 25 is moved to one side. Using the handles 22 and 23, after unfastening the clamp 24, the two frame members 20 and 21 of the frame 19 are parted and a sheet of plastics film is placed on the upper surface of the lower frame member 21. The two frame members 20 and 21 are then brought together and secured by means of the clamp 24 and the heater assembly is moved back to its previous position.

An impression or a number of impressions are then placed on the upper surface of the perforated plate 15 of the fan assembly 25, after raising the frame 19 to, and securing it at, a desired position a short distance below the heater assembly 25. The heater assembly, supplied with current by earlier operation of the switch 17, is then allowed to heat-soften the plastics film in the frame 19.

When softened to the desired degree, the motor of the fan assembly 10 is switched on and the frame 19 is lowered to its maximum extent on the track 18 in which position the lower frame member 21 is sealingly engaged over the air inlet 14 of the fan assembly 10.

The suction of the fan of the fan assembly causes the heat softened plastics film in the frame 19 to be drawn down over the impression(s) on the perforated plate 15 and to be deformed to their shape. When so deformed and the film has cooled, the frame 19 is raised, the heater assembly 25 moved to one side, the fan motor switched off, the frame 19 opened and the film removed from the frame 19 together with the impressions which are temporarily retained by the film. The impressions are then pressed out manually leaving cavities in the film which accurately reproduce the shape(s) of the impression(s).

Manufacture of an ear insert by a process according to the invention will now be described, by way of example only.

EXAMPLE

An impression of the ear canal of a patient was formed by direct moulding in the patient's ear using a proprietary rubbery material well-known for use for this purpose (e.g. "Panasil A"). Four further identical impressions were taken from the same patient, the five impressions then being placed on the perforated plate 15 of the apparatus shown in the accompanying drawing.

The heater assembly 25 of the apparatus was then switched on for 10 minutes. A sheet of polycarbonate resin (0.060 mm thick) was then fixed in the frame member 21 and the sheet brought up to the pre-heated assembly 25. After approximately 3 minutes, the polycarbonate sheet was sufficiently thermosoftened, sagging at its middle by an amount of approximately 1.25 cm.

The frame 19 was then lowered onto the perforated plate 15 to bring the thermo-softened sheet into contact with the impressions. Vacuum drawing resulted causing the sheet of plastics material to be drawn down tightly over the impressions accurately conforming to the shape of each.

The frame and sheet were retained in this lowered position and the vacuum applied for a few seconds until the sheet of polycarbonate resin had set. The frame 19 was then raised, the deformed sheet was removed from the apparatus and each impression pressed out of the vacuum-formed sheet of polycarbonate resin to leave five mould cavities.

One of the so-formed cavities was cut from the sheet to form a mould which was then filled with a self-curing acrylic resin, e.g. "Duro" (Trade Mark of Eden Vale Laboratories) self curing denture base acrylic material. A piece of wire which retained its shape when bent was then inserted into a tube. The wire and tube were then bent to conform to a desired configuration and were then inserted vertically into the resin until they reached the base of the cavity. A tubular plastics barb was then threaded onto the upper end of the wire so as to be partially embedded in the resin. The purpose of these measures is to provide in the finished insert a meatal passage (when the wire or wire and tube are subsequently removed) and a barb, connected to the passage, to the projecting end of which barb can be connected a tube for connection to the acoustic output of a hearing aid. The mould was then placed in a warm glycerine bath maintained at approximately body temperature and a suitable pressure, typically 3.5 kg/cm$^2$ (gauge), applied. The mould was left to cure in this condition for at least 5 minutes, e.g. 10 minutes, and then the cured acrylic resin material was manually removed from the mould.

The resulting moulded insert was found to be highly polished and needed no trimming or further polishing on the surfaces which, in use, contact the ear. The flat surface not in contact with the polycarbonate sheet when insert is in the mould was polished by means conventional in the art. The ear insert was found to fit snugly in the patient's ear and in use not to give rise to any acoustic feedback. It was also found that, to avoid any possible allergenic response from the patient, the patient's ear could be protected from contact with the ear insert by first placing the ear insert back in one of the moulds produced by the suction-forming operation, and it was found that when used in this manner the ear insert was equally satisfactory, still providing a snug fit and resulting in no acoustic feedback.

FIG. 2 shows the completed insert. The earcontacting surface being uppermost, the meatal passage is indicated at 30 and the tubular barb at 31. The aperture 32 is formed to reduce the overall weight of the insert and is normally formed by cutting-away a central part of the impression before it has been moulded. Alternatively the aperture 32 may be cut out after the ear insert has been moulded, or a former can be placed in the mould cavity prior to moulding.

In other embodiments of the invention the pressure deformable sheet of material may be deformed over the impression of the ear canal by the application of an over pressure instead of by the application of a suction. Furthermore the ear insert could be drilled after moulding to provide the meatal passage or to enable tubing and/or a tubular barb to be glued into the drilled passage. However it should be realised that it is preferred to mould as opposed to drilling the meatal passage since the meatal passage can be moulded to change directions by gently curving the passage. If the meatal passage is drilled a change of direction can only be made by drilling bores from two different directions, the two drilled bores meeting at an angle. It will of course be appreciated that a gently curving meatal passage is preferred acoustically to an angled meatal passage.

The suction generated by the electric motor driven fan assembly 10 for vacuum-drawing the pressure deformable sheet over the impressions could be generated instead by other means. For example if a straight main tube was provided having a branch tube extending at right angles to the main tube, sufficient suction could be generated at the outlet of the branch tube by running tap water through the main tube at a sufficient pressure, e.g. 3 kg/cm$^2$ (gauge).

Finally it should be realised that any form of insert may be moulded, e.g. solid, shell or skeleton. The insert may be moulded from different materials to have a soft tip or tips with the rest of the material moulded from harder material. Alternatively the insert may be moulded completely from soft, semi-soft or semi-hard material. In addition the solidified moulding material may be retained in the mould cavity formed in the sheet material to act as a protective packaging or as a covering, e.g. a non-allergenic covering, in use of the insert. The dashed line in FIG. 2 schematically indicates the sheet material, the insert being retained in the mould cavity formed in the sheet material. The small circles on the sheet in FIG. 2 represent where the sheet material has been drawn into the perforations of the perforated plate 15 during application of the suction to draw the softened sheet material over the impression(s) on the plate 15.

Although the invention has been described with reference to a particular embodiment thereof, it will be understood by those skilled in the art that various changes in the method and construction of the body insert may be made without departing from the spirit or the scope of the present invention.

I claim:

1. A method of making a molded ear insert comprising forming a molded shape conformed impression of an ear canal by insertion of a plastic molding compound in the ear canal, removing the so-formed shaped impression subsequent to setting of the compound, thereby forming an ear canal preform, juxtaposing the so-formed ear canal preform to a sheet of pressure deformable plastic material, applying a vacuum to the sheet and directly and accurately vacuum conforming the sheet to the shape of, and vacuum forming the sheet material about, the previously formed ear canal preform, separating the previously formed ear canal preform from the sheet without permanently deforming the impression conformed shape of a deformation mold cavity formed in the sheet, retaining the so-shaped deformation mold cavity in the sheet as an ear insert forming female mold, for forming subsequent accurately conformed ear canal inserts, inserting a molding compound into the shaped female preformed molding cavity in the sheet to form, after setting of the molding compound, a removable and finalized ear insert of a shape and size accurately corresponded to that of the ear canal.

* * * * *